United States Patent [19]

Baldwin et al.

[11] Patent Number: 4,600,887
[45] Date of Patent: Jul. 15, 1986

[54] MICROWAVE ELECTROMAGNETIC BOREHOLE DIPMETER

[75] Inventors: Willett F. Baldwin, Dallas; Liang C. Shen, Houston, both of Tex.

[73] Assignee: Mobil Oil Corporation, New York, N.Y.

[21] Appl. No.: 601,464

[22] Filed: Apr. 18, 1984

[51] Int. Cl.⁴ ............................................. G01V 3/30
[52] U.S. Cl. .................................................... 324/333
[58] Field of Search ........................ 324/332, 333, 338

[56] References Cited

U.S. PATENT DOCUMENTS

| | | | |
|---|---|---|---|
| 2,455,942 | 12/1948 | Coggeshall et al. | 324/333 |
| 3,114,875 | 12/1963 | Haagensen | 324/338 |
| 3,125,717 | 3/1964 | Ghose | 324/332 |
| 3,388,323 | 6/1968 | Stripling | 324/333 |
| 3,582,766 | 6/1971 | Iizuka | 324/338 |
| 3,849,721 | 11/1974 | Calvert | 324/338 |
| 3,944,910 | 3/1976 | Rau | 324/338 |
| 4,013,950 | 3/1977 | Falls | 324/332 X |
| 4,019,126 | 4/1977 | Meador | 324/333 |
| 4,045,724 | 8/1977 | Shuck et al. | 324/338 |
| 4,107,597 | 8/1978 | Meador et al. | 324/341 |
| 4,383,220 | 5/1983 | Baldwin | 324/338 |

FOREIGN PATENT DOCUMENTS 1088824 10/1967 United Kingdom ................ 324/333

OTHER PUBLICATIONS

"Electromagnetic Propagation . . . A New Dimension in Logging," Society of Petroleum Engineers of AIME, Paper No. SPE 6542, by Thomas J. Calvert and Rama N. Rau, 1977.

Primary Examiner—Gerard R. Strecker
Attorney, Agent, or Firm—A. J. McKillop; Michael G. Gilman; George W. Hager, Jr.

[57] ABSTRACT

A microwave electromagnetic logging tool for use in the determination of the dip of subsurface earth formations includes a continuous source of microwave energy, three microwave antennas positioned from the longitudinal axis of the logging tool and spaced approximately equally around such axis, and a device for measuring the loading effect on the three antennas as the three antennas continuously transmit microwave energy into the formations during movement of the logging tool through the borehole.

2 Claims, 4 Drawing Figures

MICROWAVE ELECTROMAGNETIC BOREHOLE DIPMETER

BACKGROUND OF THE INVENTION

This invention relates to a system and method for determining the dip of subsurface formations penetrated by a borehole. More particularly, this invention is directed to an apparatus and method that uses electromagnetic energy to determine a dip of subsurface formations penetrated by a borehole.

A discussion of the determination of dip of subsurface formations and of dipmeters is found in FORMATION EVALUATION by Edward J. Lynch, Harper & Row, Publishers, New York, Evanston and London, beginning at page 341. It is there pointed out that the problem of the determination of formation dip evolves into one of locating three points within a depositional layer with reference to a horizontal plane such that a plane is defined by the three points and the angle of dip is that angle between this plane and the horizontal plane. Instruments have been used which can record three electric logs properly spaced and oriented in a single borehole to determine the dip of the subsurface formations penetrated by the borehole. These instruments require an accurate directional survey of the borehole. Wireline dipmeters which are commonly used for this purpose must make three basic measurements. The first is the measurement of dip of the formation relative to the borehole. This has been done by including identical sets of electrodes spaced at 120° and all on the same plane perpendicular to the axis of the tool. The second is a measurement of the direction and angle of inclination of the borehole, and the third is a measurement of the orientation of the tool relative to magnetic north.

Early dipmeters used three SP curves to get the dip relative to the hole axis and used a photoclinometer to determine the hole inclination and direction. A continuous type of dipmeter later introduced employs three microlog devices to make the three required eletrical logs. The microdevices are always pressed against the wall of the borehole, thus causing the spacing between them to change as the size of the borehole changes. This necessitates the recording of the borehole size.

In U.S. Pat. No. 3,388,323 to Allen A. Stripling, there is described a technique which has become known as "induction logging" for determining a dip of subsurface formations. Two independent parameters indicative of magnetic susceptibility and electrical conductivity or resistivity are derived from magnetic field measurements carried out at three angular positions adjacent a borehole wall. Three coils are employed for carrying out the borehole measurements. These coils are energized to generate magnetic fields at three angular regions around the borehole wall, and the outputs thereof are phase separated into magnetic susceptibility and resistivity measurements. A 10,000-cycle-per-second oscillator and a 1,000-cyle-per-second oscillator are employed for energizing the coils. These high- and low-frequency oscillators are employed to increase the sensitivity of the coil to changes in electrical conductivity and magnetic susceptibility.

In a paper entitled "ELECTROMAGNETIC PROPAGATION . . . A New Dimension in Logging" by Thomas J. Calvert, Rama N. Rau, and Larry E. Wells, prepared for presentation at the 1977 47th Annual California Regional Meeting of the Society of Petroleum Engineers of AIME in Bakersfield, Calif., Apr. 13–15, 1977, there is described the operating principles of a well logging tool that measures the phase shift and attenuation of microwave-frequency energy propagated through the formations near a borehole. Also described is an interpretation method for deriving from these measurements the values of porosity and water saturation of earth formations. It is pointed out that this tool is most accurate in fresh water. It is further pointed out at page 15 that the tool is designed for fresh mud applications and that signal levels may be too low in salt muds and signals are not reliable in oil- or gas-filled boreholes.

Logging techniques using electromagnetic energy are described in U.S. Pat. Nos. 3,849,721 to Thomas J. Calvert; 3,944,910 to Rama N. Rau; 4,107,597 to Meadow et al; and 4,383,220 to Baldwin. In the Baldwin patent a borehole tool is provided that is adapted for moving through the borehole and that has at least three antenna arrays positioned approximately equally around the longitudinal axis of the tool. Each antenna array has one transmitting antenna and one receiving antenna spaced longitudinally one from the other. The tool is adapted for supporting and positioning the antenna arrays against the wall of the borehole. The tool further includes means for simultaneously supplying electromagnetic energy into the earth formations. Further provided are means coupled to each of the receiving antennas for detecting the signal received by each receiving antenna.

SUMMARY OF THE INVENTION

In accordance with the present invention there is provided a microwave electromagnetic logging tool for use in the determination of the dip of subsurface earth formations surrounding a borehole.

A borehole logging tool adapted for movement through a borehole includes at least three microwave antennas positioned from the longitudinal axis of the tool and spaced approximately equally around such axis. A source of microwave energy is applied to each of the antennas for continuous irradiation of the formations surrounding the borehole as the tool is moved through the borehole. The loading effect of the formation impedance on each of the antennas is measured and signals proportional to such loading effect produced. Such signals are utilized in the determinaton of the dip of the formations surrounding the borehole.

In one aspect, the voltage imposed across each of the antennas is measured as being representative of the formation loading effect. In another aspect, the complex impedance imposed on each of the antennas is measured as being representative of the formation loading effect. Signals are produced representative of both the real and imaginary components of such complex impedance.

In a further aspect, each of the microwave antennas is a waveguide antenna. Both forward and reverse traveling waves can be measured as representative of complex impedance. In a still further aspect, each of the microwave antennas may be a microstrip antenna.

DESCRIPTION OF THE PREFERRED EMBODIMENTS

This invention is directed to a system and method for determining the dip of subsurface earth formations penetrated by a borehole. The system is comprised of a borehole dipmeter which utilizes electromagnetic energy for determining the dip of subsurface earth formations that are penetrated by a borehole.

The overall general appearance of the electromagnetic dipmeter is quite similar to conventional dipmeters. An elongated borehole tool is provided that is adapted for movement through the borehole. A multiconductor logging cable containing electrical conductors for transmitting electrical signals intermediate the surface of the earth and the borehole tool connects with the borehole tool and provides for lowering and raising the tool in the borehole. In operation, the logging cable extends to a means such as a reel for lowering and raising the tool in the borehole. The borehole tool includes at least three antenna arrays positioned from the longitudinal axis of the tool and spaced approximately equally around the axis, approximately 120° one from the other. More than three antenna arrays may be included but three are normally sufficient. Therefore for simplicity of description, this tool will hereafter be described as having three antenna arrays.

The tool is adapted for supporting and positioning the three antenna arrays against the wall of the borehole. A means is provided for simultaneously supplying electromagnetic energy of a frequency within the range of 1.0 to 3.0 gigahertz (GHz) to each of the antennas for continuously transmitting electromagnetic energy into the earth formations. Electromagnetic energy need not be continuously transmitted but may be pulsed or any type of periodic transmission. However, continuous transmission is preferred to obtain a continuous indication of formation changes. The antennas have coupled thereto means for measuring the loading effect of the formation impedance on the antenna during such continuous transmission. From this loading effect on each of the three antennas, the dip of the formations surrounding the borehole may be determined.

Figure 1:
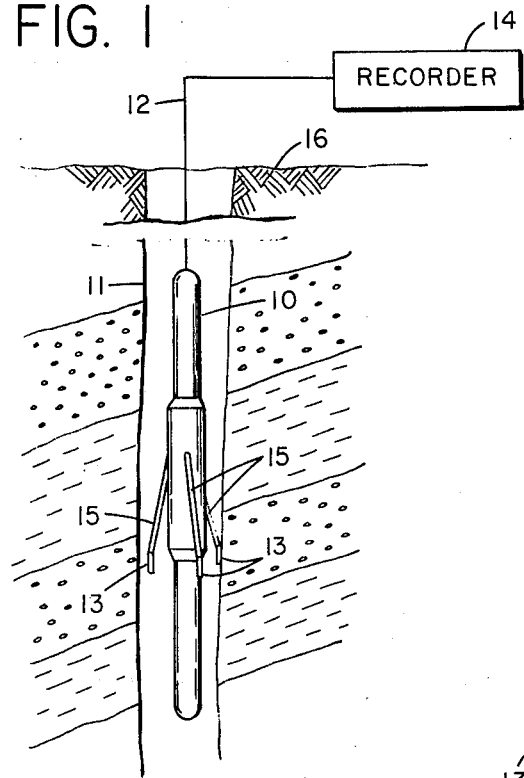
FIG. 1 is a schematic drawing illustrating the system for determining dip of subsurface formations located in a borehole.

The invention is now described in more detail by reference to the drawings. In FIG. 1 there is schematically shown an electromagnetic dipmeter 10 supported in a borehole 11 by a multiconductor logging cable 12 which extends from the electromagnetic borehole dipmeter 10 to the surface 16 of the earth. The multiconductor cable 12 is illustrated connecting with a recorder 14 for recording signals received by the electromagnetic dipmeter 10. The electromagnetic dipmeter 10 includes at least three pads 13 comprised of antennas spaced approximately equally around the longitudinal axis of the dipmeter 10. The pads desirably are aligned along a horizontal plane which passes perpendicular through the longitudinal axis of the dipmeter 10. The pads 13 are adapted for being supported by the dipmeter 10 and positioned against the wall of the borehole 11. A support means 15 may be provided to support the pads 13 and to position them against the wall of the borehole 11. The dipmeter 10 also includes other conventional means for determining and transmitting to the surface of the earth such information as the size or caliper of the borehole, the deviation of the borehole from the vertical, the relative bearing of the borehole to the pads, and the compass bearing or azimuth of the pads.

Figure 2A:
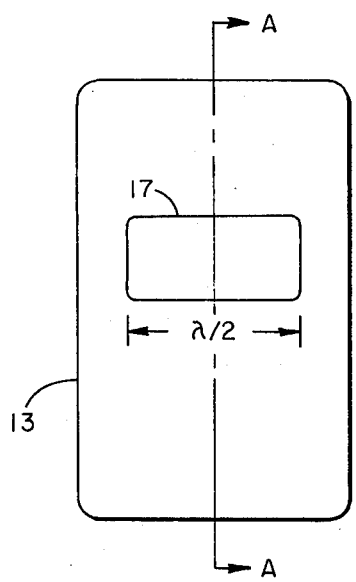
FIGS. 2A and 2B are schematic views of a pad housing an antenna.
Figure 2B:
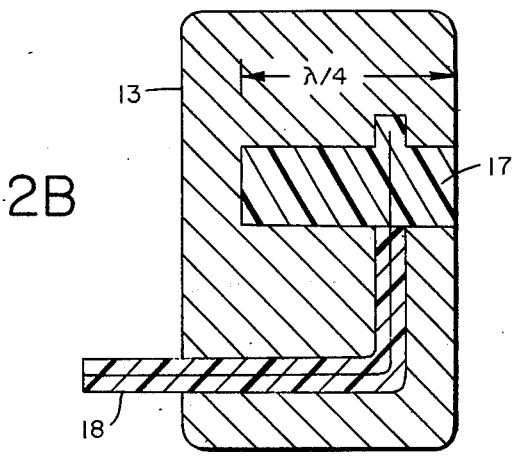

With reference now to FIGS. 2A and 2B, there are shown front views and cross-sectional views of a pad 13 containing an antenna for transmitting electromagnetic energy signals. It is desirable that the pads 13 be of a relatively small size. This lessens the variance which might otherwise be caused by hole rugosity. It also increases the vertical resolution. In general terms, the overall dimensions of the pads 13 may be in the range of about three inches in width by five inches in length by one and one-half inches in thickness. The antenna 17 desirably has a horizontal width of about one-half the wavelength of the electromagnetic energy to be used. In FIG. 2B there is shown a cross-sectional view of the pad 13 along the line A—A. A coaxial cable 18 carries electromagnetic energy to the antenna 17. The slot making up the antenna 17 would extend from the face of the antenna for a distance of about one-fourth of the electromagnetic wavelength to be used back into the material of the pad 13. Antenna 17 is commonly termed a slot antenna and functions as an electromagnetic energy waveguide.

Figure 3:
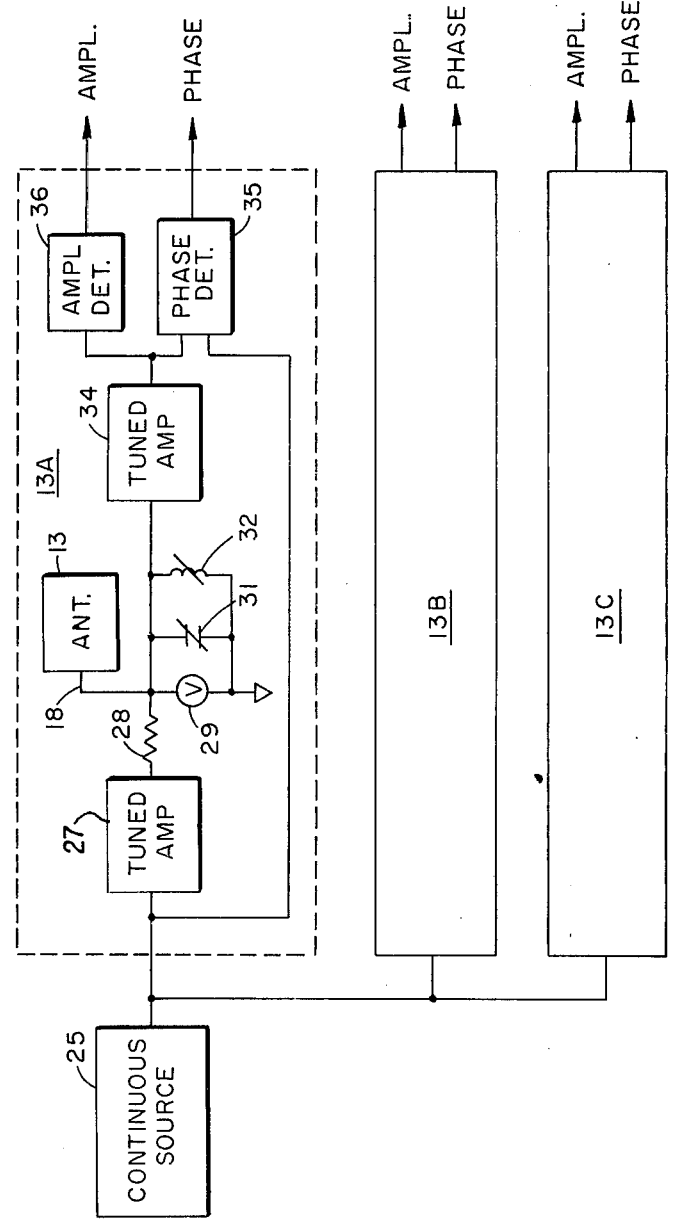
FIG. 3 is an electronic block diagram illustrating the system of determining dip of subsurface formations.

With reference now to FIG. 3, there is shown an electronic block diagram of the electromagnetic dipmeter. In this block diagram there are shown the three antennas 13, designated as antennas 13a, 13b, and 13c, of the electromagnetic dipmeter. As previously discussed, the dipmeter could be adapted with more than three antennas, but three antennas are sufficient to obtain data indicative of the dip of subsurface formations penetrated by the borehole. An oscillator 25 for generating selected electromagnetic frequencies within the frequency range of 1 to 3 GHz is used in this electromagnetic dipmeter. Such oscillators have been used in downhole equipment as is illustrated in U.S. Pat. Nos. 3,944,910 and 4,092,583, which patents are concerned with investigating earth formations surrounding a borehole and with determining the water-filled porosity of formations surrounding a borehole. One oscillator 25 is sufficient for the present dipmeter.

In operation, the oscillator 25 generates electromagnetic energy within a selected frequency range of 1 to 3 GHz and desirably of a frequency of about 2 GHz, and this electromagnetic energy is transmitted to each of the antennas 13a, 13b, and 13c. Each of these antennas is identical in configuration and operation, accordingly, only amplifier 13a will now be described in detail in conjunction with the circuitry illustrated in FIG. 3.

The electromagnetic energy from oscillator 25 is applied through tuned power amplifier 27 to antenna 13.

Located between tuned amplifier 27, and antenna 13, is the load monitoring circuitry including resistor 28, voltmeter 29, variable capacitance 31 and variable inductance 32. The function of voltmeter 29 is to monitor the loading effect of the impedance of the borehole wall and the earth formation surrounding the borehole as the logging tool 10 is advanced through the borehole. This loading effect will vary with the impedance of the formation immediately adjacent the borehole and may be measured or monitored by a high frequency solid state RMS voltmeter 29 connected to the coaxial cable 18 leading to the antenna 13. It is not necessary to actually measure the actual impedance in order to determine formation dip. It is, however, important to measure the loading effect of impedance on the antenna 13. Any change in formation impedance such as caused by a dipping subsurface interface, will cause a proportional change in the voltage measured by voltmeter 29. By comparing the voltages from the voltmeters associated with each of the three antennas 13a–13c, a dipping subsurface formation can be identified.

Variable capacitance 31 and variable inductance 32 serve to tune voltmeter 29, to maximize the voltage variations as the loading on the antenna 13 varies.

The measurements from voltmeter 29 of each of the antennas 13a–13c is applied to tuned amplifier 34. The output of amplifier 34 is applied to phase detector 35 which determines the phase between the measured voltage across antenna 13 and the signals produced by the continuous source 25. The output of amplifier 34 is also applied to amplitude detector 36 which produces a signal proportional to the amplitude of the measured voltage across antenna 13. Both these phase and amplitude measurements are sent up the logging cable to the surface of the earth. At the surface, the amplitudes of the received signals from each of the antennas 13a, 13b, and 13c may be compared one to the other in a manner similar to that used by conventional induction or electrical dipmeters to determine the dip of the subsurface formations penetrated by the borehole. Likewise, the phase of the received signals may be compared one to the other to determine the dip of the subsurface formations. In logging boreholes, better results may be obtained in some cases using the amplitude comparison; while in others, better results may be obtained using the phase comparisons. For this reason it may be desirable to include both of these capabilities in the borehole dipmeter. One such method for determining dip from amplitude or phase measurements is described in the aforementioned reference in FORMATION EVALUATION by Edward J. Lynch. Although not shown, it will be understood that the borehole tool includes means for measuring and transmitting to the surface of the earth the direction and angle of inclination of the borehole for measuring the orientation of the tool relative to magnetic north and the size of the borehole.

Other electrical parameters than voltage might also be measured across the antennas 13a–13c and utilized in dip determination so long as the measured parameter represents the loading effect on the antennas of the formation impedance at any point along the borehole. For example, the actual load impedance imposed on the antennas by the formation can be directly measured. A suitable impedance measuring device that could be utilized in place of the voltmeter 29 is the Hewlett Packard Model 8505A RF Network Analyzer, adapted for downhole conditions. Such a RF network analyzer measures complex impedance at high frequencies. Measurements of voltages becomes more difficult as frequency increases. The RF network analyzer utilizes transmission line theory in terms of forward and reverse traveling waves. These traveling waves make a logical replacement for voltages in high frequency measurements.

In addition, information on the complex impedance can be important when there is sufficient mud cake build-up on the borehole wall to interfere with the measurement of the formation impedance. Below about 1/32" to ⅛" of mud cake thickness, both the real and imaginary components of the load impedance measurement by the antennas 13a, 13b, and 13c remain relatively constant. Above such 1/32" to ⅛" of mud cake thickness the real component of the complex impedance increases much more rapidly with increase in mud cake conductivity than the imaginary component of the complex impedance. Consequently, the effect of the mud cake on the real component of the impedance loading measurements by the antennas 13a, 13b, and 13c must be taken into account in formation dip determination.

An alternative to the above-described waveguide embodiment for the antennas 13 for transmitting and receiving microwave electromagnetic energy is the microstrip antenna. This antenna is an elliptical-shaped printed circuit antenna such as is illustrated and described in "The Elliptical Microstrip Antenna With Circular Polarization", IEEE Transactions On Antennas And Propagation, Vol. AP-29, No. 1, January 1981 by Liang C. Shen and in "An Experimental Study of the Circular-Polarized Elliptical Printed-Circuit Antenna", IEEE Transactions On Antennas And Propagation, Vol. AP-29, No. 1, January 1981 by Stuart A. Long, Liang C. Shen, Daniel H. Schaubert, and Frederick G. Fauer.

It is to be understood that various other modifications and changes may be made to the above-described preferred embodiment without departing from the spirit and scope of the invention as set forth in the appended claims.

We claim:

1. A method of microwave electromagnetic logging to determine the dip of subsurface earth formations surrounding a borehole, comprising the steps of:
    (a) advancing a borehole logging tool through a borehole, said logging tool including a source of microwave energy and at least three microwave antennas positioned from the longitudinal axis of said tool and spaced approximately equally around said axis,
    (b) applying microwave energy to said antennas for irradiating the formations surrounding the borehole as the logging tool is moved through the borehole,
    (c) measuring the loading effect of formation impedance on said at least three antennas and producing at least three signals proportional thereto,
    (d) measuring the complex impedance imposed on said at least three antennas and producing signals representing both the real and imaginary components of said complex impedance,
    (e) utilizing said measured loading effects in the determination of the dip of the formations surrounding the borehole in the absence of interfering mud-cake conductivity along the borehole wall, and
    (f) utilizing the real component of said measured complex impedance to determine the dip of the formations surrounding the borehole at those points along the borehole where the presence of mud-cake conductivity interferes with the determination of formation dip from said measurements of the loading effects of the formation impedance on said antennas.

2. The method of claim 1 wherein the step of utilizing the said component of said measured complex impedance to determine formation dip is carried out for those portions of said borehole where the mud cake thickness on the borehole wall exceeds 1/32 inch.

* * * * *